No. 813,264. PATENTED FEB. 20, 1906.
V. WHITMAN.
APPARATUS FOR DRY CURING FISH.
APPLICATION FILED MAR. 15, 1905.
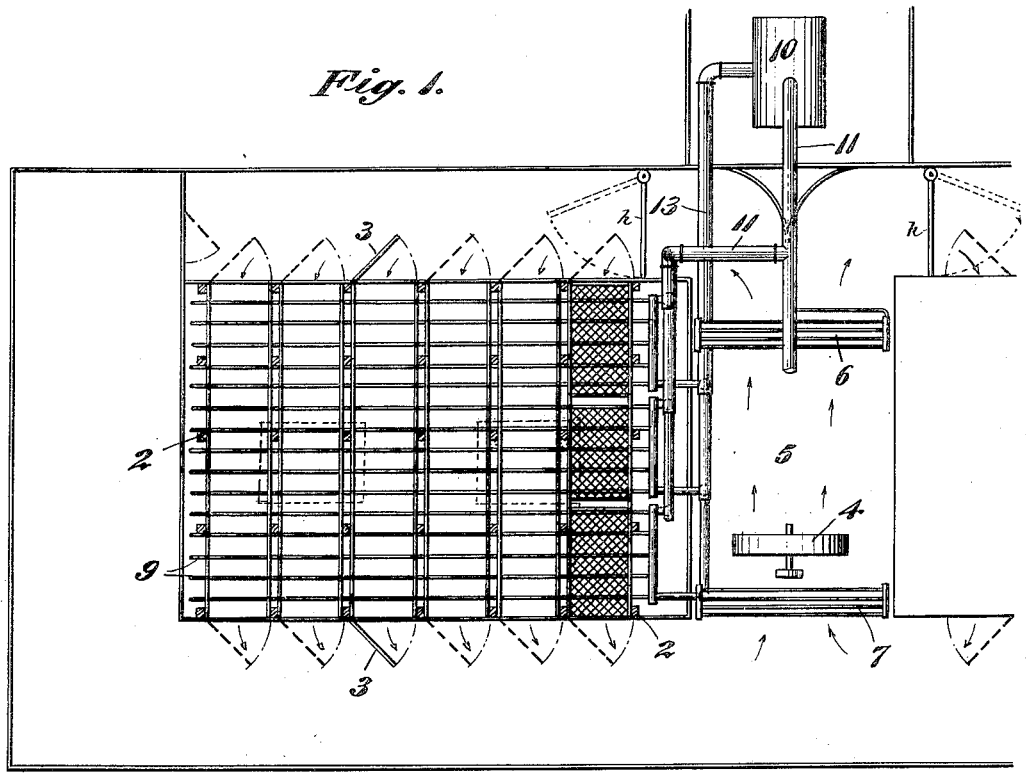
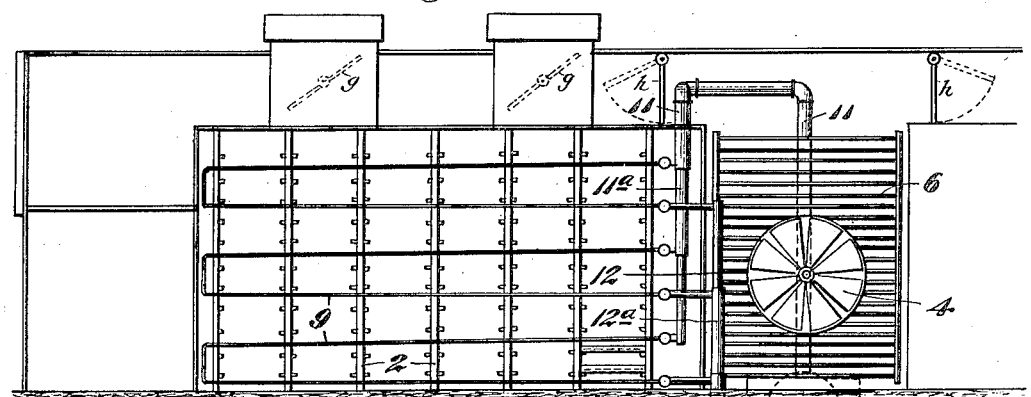
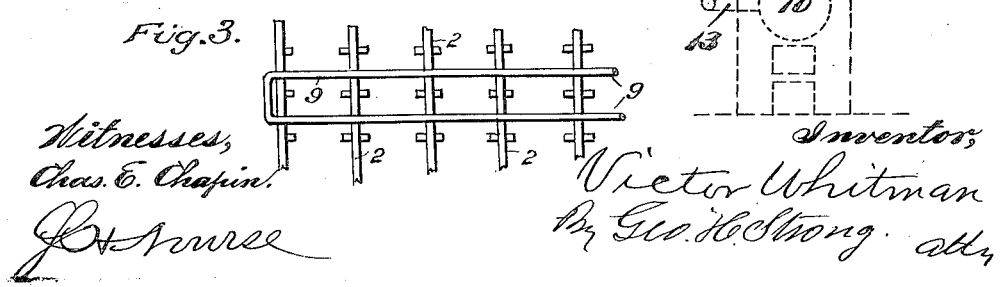

UNITED STATES PATENT OFFICE.

VICTOR WHITMAN, OF SAN FRANCISCO, CALIFORNIA, ASSIGNOR TO ALASKA CODFISH CO., OF SAN FRANCISCO, CALIFORNIA, A CORPORATION.

APPARATUS FOR DRY-CURING FISH.

No. 813,264.　　　Specification of Letters Patent.　　　Patented Feb. 20, 1906.

Application filed March 15, 1905. Serial No. 250,201.

*To all whom it may concern:*

Be it known that I, VICTOR WHITMAN, a citizen of the United States, residing in the city and county of San Francisco and State of California, have invented new and useful Improvements in Apparatus for Dry-Curing Fish, of which the following is a specification.

My invention relates to an apparatus which is especially designed for the dry-curing of salted fish, such as codfish and the like.

It consists in a combination of mechanism and in details of construction which will be more fully explained by reference to the accompanying drawings, in which—

Figure 1 is a sectional plan view of my drier. Fig. 2 is a longitudinal section of same. Fig. 3 is a detail showing the independent heating-pipes 9 passing between contiguous trays.

It has been customary to dry fish, such as codfish and the like, by spreading them after being properly cleaned and salted upon what are known as "flakes" and these exposed in the open air until the fish are in a sufficiently dry condition. Such drying is dependent altogether upon atmospheric conditions and takes a long time, and as the fish contains more or less gluten it is desirable to dry or harden this gluten, so that it retains its firmness. Being exposed to too great a heat by artificial drying it will become soft and oily, which is objectionable.

It is the object of my invention to provide an apparatus in which currents of air of greater and less temperature may be alternately passed over the trays or flakes containing the fish, and in conjunction therewith I employ heating-pipes passing through the tray-interspaces, whereby the fish may be sufficiently warmed, and an air-circulating mechanism by which currents of alternately cooled and heated air are transmitted through the interspaces between the fish.

My apparatus consists of an exterior building or buildings of suitable size and construction to suit the work which is to be carried on. Within the building are vertical posts, as at 2, extending in parallel lines and having upon them horizontally-disposed ribs or supports upon which the trays are slidable, the distance between the posts being such as to allow for the desired width of trays or flakes which rest upon the supporting-ribs and which may thus be pushed in from one end until the trays form a series of superposed passages, which are substantially closed by the fish which are spread upon the trays. A vertical circulation of air will take place when desired by reason of the open spaces between the edges of the trays upon each side of the posts 2, and these spaces are sufficient for ventilation and to allow the heated air to escape upwardly as may be desired. A series of interspaces thus formed between the superposed trays are each independently closed by doors at the ends, as shown at 3. These doors may be opened for the purpose of introducing and removing the trays as required, and the openings may also be adjusted while the curing process is being carried on so as to regulate the amount of air which passes through the apparatus. The top is closed and has ventilating-openings connecting with the vertical spaces between the posts 2, with controlling-gates $g$, by which the heating and cooling of the fish may be regulated. The "stacks," as they may be called, which contain the trays do not occupy the full width of the building, but leave a space or conduit at each end of the row of trays for the ingress and egress of air and for working space. For the purpose of circulating the air horizontally through the spaces between the trays I have shown a fan or air-forcing mechanism of any suitable description, as at 4. The air is forced by this fan through a passage, as at 5, and passes over a series of heated pipes, as at 6. These pipes may be heated, preferably by steam or hot water, and are sufficiently numerous to raise the temperature of the air to the desired degree. The air after passing through these pipes is directed into the conduit at one end of the rows of trays, and passing through the doors 3 the air will pass between the superposed rows of trays and escape into the open conduit at the opposite end of the row of trays. This conduit connects directly with the inlet of the air-forcing mechanism 4, so that the air after passing through the trays is again returned to pass through the air-forcing mechanism to be again reheated and circulated. After the flow of heated air has continued for a certain time it is necessary to pass a current of cool air over the fish. This is effected by the use of a refrigerator or cooler 7, which may consist of a series of pipes suitably cooled and through and between which the air is passed and its temperature reduced sufficiently before the air is again passed through the fan. The temperature of the cooler and that of the heating-coil may be regulated in any suitable manner, and the air may also be deprived of just sufficient moisture to give the desired results in curing the fish. The variation in the temperatures will insure an exact result in this particular. A certain amount of the air will escape upwardly through the intermediate channels between the posts upon which the drying-trays are supported, as previously described, and also through the ventilators, and sufficient fresh air to replace the loss will enter through various openings in the walls of the building.

In conjunction with the air-circulating means here described I employ independent heating-pipes, as at 9. These pipes are located between the trays of fish and extend from one end to the other between one set of trays and may return through the next contiguous space, as shown in Fig. 5, so that each line of trays will have a heating-pipe both above and below it, and each line of pipe will also lie between the two contiguous superposed rows of trays. In Fig. 2 for the sake of clearness of illustration I show the pipe 9 as returning beneath the second line of trays, so that there are two trays of each row between each pipe 9 and its returned portion. I have found that hot water for this purpose is very satisfactory. Heat for this purpose is supplied from any suitable boiler, as at 10, and by means of a main conducting-pipe 11 a sufficient quantity of heat is conveyed from the boiler to supply the pipes passing between the trays. This main pipe may have a sufficient size to carry all the requisite heat to the point where the first line of pipe 9 is taken out. The return portion of this pipe discharges into a receiving-pipe 12 of sufficient size and independent of the main pipe. The main pipe is reduced, as shown at $11^a$, after the first distributing-pipe 9 is taken out, and the next distributing-pipe takes its supply from this reduced portion and returns it into a section $12^a$, which is continuous with the section 12, but is enlarged sufficiently to receive the added amount of heating medium. Thus the main conducting-pipe is reduced after each distributing-pipe 9 has been taken out, and the receiving and return pipes are correspondingly enlarged. From the last of these return-pipes the heating medium is returned to the boiler through a pipe 13. Thus a circulation is maintained. The temperature of the heating medium may be easily controlled, so that only a sufficient amount of heat will be distributed between the trays for the proper curing of the fish.

If a single house and a single curing-stack is employed, the circulation will take place through that stack as heretofore described; but, if desired, a plurality of such houses, each containing a curing-stack, may be located upon each side of the air-forcing mechanism and the heating medium, and the air may be diverted to each of the stacks either simultaneously, or, if desired, it may be temporarily cut off at one side by suitable gates $h$, which will divert the air to the other stack, and the alternate circulation of cooled and heated air may in the same manner be effected by properly-disposed valves or cocks.

By this construction the curing-stacks may be alternately heated and cooled to any desired degree and for the purpose of preventing the overheating of the fish and alternately providing warm and cool currents of dry air, which experience has shown to be most effective in properly curing the fish.

Having thus described my invention, what I claim, and desire to secure by Letters Patent, is—

1. An apparatus for curing fish comprising superposed trays forming intermediate horizontal spaces for the passage of air, said trays being disposed in series side by side and having vertical ventilating-passages between the series, and means for passing alternate hot and cold currents of air intermittently through the horizontal passages.

2. In an apparatus for curing fish, vertical posts in parallel lines, parallel series of trays superposed to form horizontal passages and supported between the posts, the edges of said trays and the posts forming vertical passages in open communication with the horizontal passages, doors by which the opposite ends of the horizontal passages are controlled, an air-forcing mechanism and connection between said mechanism and the controlled passages.

3. In an apparatus for curing fish, vertically-disposed supports, trays slidable thereon and forming horizontal passages between the superposed series of trays, doors adjustable at the ends of the spaces between the trays, conduits connecting with each end of the tray series, an air-forcing mechanism, a heating-coil through which the air passes therefrom before being admitted to the drying-chambers, connections between the escape-passage and the air-forcing mechanism whereby the air may be continuously circulated through the drying-chambers, and vertical passages connecting with the interspaces between the trays.

4. In an apparatus for curing fish, horizontally-movable superposed trays forming a series of horizontal interspaces, doors located at opposite ends of these spaces and adjustable to regulate the movement of air therethrough, an air-forcing mechanism, a heating-coil through which the air is passed from said mechanism, a conduit through which the heated air is delivered to the inlet ends of the spaces between the trays, a second conduit into which the air is delivered after passing through the tray-interspaces said chamber connecting with the air-forcing mechanism, a cooling-coil so located that said air passes through the coil before again entering the air-forcing mechanism, and controlling means by which the air is intermittently subjected to a heating and a cooling process.

5. In a fish-curing apparatus, chambers consisting of a series of supports, and trays superposed thereon to form horizontal passages between the trays, controlling and regulating doors at each end of said chambers, an air-forcing mechanism, a heating-coil through which the air is passed, a conduit conducting the air to the inlet ends of the curing-chambers, a receiving-conduit at the opposite end of said chambers, said conduit connecting with the air-forcing mechanism, a cooling-coil located anterior to the air-forcing mechanism and vertically-disposed ventilating-passages between the parallel and successive series of trays and their supports whereby both a horizontal and vertical circulation of air may be effected.

6. In a fish-curing apparatus, a chamber having successive series of horizontally-disposed trays superposed to form horizontal passages, means for heating and circulating air through said passages, an independent series of heating-pipes passing through the space between the trays and operating in conjunction with the air-currents, a boiler, pipes leading therefrom to supply the circulating system, and other pipes with which said system connects and by which the heating medium is returned to the boiler.

7. In a fish-curing apparatus, a plurality of chambers, each composed of vertically-disposed studding with rails upon each side, trays adapted to contain fish, and fitting and slidable upon said rails so as to form substantially independent superposed series of air-spaces upon each side of the vertical posts, vertically-disposed ventilating-openings between said posts connecting with each of the horizontal air-passages, heating-pipes extending transversely through one horizontal passage, and returning through the next contiguous one, connections by which a heating medium is supplied from and returned to a heater, an air-forcing mechanism, a heating-coil through which the air is passed from said mechanism, a conduit extending from said coil and connecting with each of the successive series of horizontal passages, doors at opposite ends of the passages, whereby the inlet and outlet of the air and its horizontal and vertical circulation may be controlled, a conduit into which the air discharged from between the horizontal trays is admitted, said conduit connecting with the inlet side of the air-forcing mechanism, and a refrigerating-coil, through which the air passes before reaching the said mechanism.

8. An apparatus having in circuit a drying-chamber consisting of superposed trays forming horizontal passages between them, means to discharge the heated air vertically from the spaces between the trays, means to alternately circulate bodies of cool and heated air horizontally through said spaces, and means to regulate the air-supply passing between the trays.

9. An apparatus for curing fish, having in circuit superposed series of trays forming horizontal passages between them, an air-forcing mechanism and conduits connecting said mechanism with both inlet and outlet ends of the passages, independent heating and cooling devices located in the circuit, and means for controlling the alternate flow of heated and cooled air through the apparatus.

10. An apparatus for curing fish, having in circuit a plurality of parallel and superposed series of trays forming horizontal passages between each series of trays, an air-forcing mechanism and conduits connecting said mechanism with both inlet and outlet ends of the tray-interspaces, independent heating and cooling devices located in the circuit, means for controlling the flow of air through the apparatus, and vertical conduits between the superposed series with open communication with the tray-interspaces.

11. An apparatus for curing fish having a plurality of vertical independent circuits each including parallel and superposed series of trays forming horizontal interspaces, an air-forcing mechanism, and independent heating and cooling devices located in that portion of the circuit common to both series of trays, conduits and gates whereby the flow from the air-forcing mechanism may be diverted to one series and cut off from the other, and means for regulating the flow through either series.

12. An apparatus for curing fish having in circuit parallel and superposed series of trays forming horizontal passages between the superposed trays, an air-forcing mechanism and conduits connecting said mechanism with both inlet and outlet ends of the tray-interspaces, independent heating and cooling devices located in the circuit with means for controlling the flow through the apparatus, independent heating-pipes located in the tray-interspaces and vertical conduits connecting with said interspaces.

In testimony whereof I have hereunto set my hand in presence of two subscribing witnesses.

VICTOR WHITMAN.

Witnesses:
HARRY J. LASK,
W. W. GOGGIN.